United States Patent
McGarvey et al.

(10) Patent No.: US 8,916,117 B2
(45) Date of Patent: Dec. 23, 2014

(54) CORROSION CONTROL IN ACID GAS REMOVAL EQUIPMENT BY THE SITU GENERATION OF POLYSULFIDE IONS

(71) Applicants: Gordon Bryce McGarvey, Sarnia (CA); Robert J. Falkiner, Brampton (CA); David R. Slim, Sarnia (CA); Bryan M. Knickerbocker, Centreville, VA (US)

(72) Inventors: Gordon Bryce McGarvey, Sarnia (CA); Robert J. Falkiner, Brampton (CA); David R. Slim, Sarnia (CA); Bryan M. Knickerbocker, Centreville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/097,926

(22) Filed: Dec. 5, 2013

(65) Prior Publication Data

US 2014/0093440 A1    Apr. 3, 2014

Related U.S. Application Data

(63) Continuation-in-part of application No. 13/568,561, filed on Aug. 7, 2012, now Pat. No. 8,668,887.

(51) Int. Cl.

| | |
|---|---|
| *B01D 53/48* | (2006.01) |
| *B01D 53/62* | (2006.01) |
| *C23F 11/00* | (2006.01) |
| *B01D 53/52* | (2006.01) |
| *B01D 53/14* | (2006.01) |
| *B01D 53/73* | (2006.01) |
| *B01D 53/78* | (2006.01) |
| *C01B 17/20* | (2006.01) |
| *C23F 11/06* | (2006.01) |

(52) U.S. Cl.
CPC ............ *B01D 53/52* (2013.01); *B01D 53/1468* (2013.01); *B01D 53/73* (2013.01); *B01D 53/78* (2013.01); *C01B 17/20* (2013.01); *C23F 11/06* (2013.01); *B01D 2251/304* (2013.01); *B01D 2251/604* (2013.01); *B01D 2252/20426* (2013.01); *B01D 2252/20484* (2013.01); *B01D 2252/606* (2013.01); *B01D 2257/408* (2013.01); *B01D 2257/602* (2013.01)
USPC ............ 423/220; 423/228; 423/511; 423/562; 423/565; 252/387; 422/7; 422/13; 210/748.17

(58) Field of Classification Search
USPC .......... 423/511, 562, 565, 220, 228; 252/387; 422/7, 13; 210/748.17
See application file for complete search history.

(56) References Cited

U.S. PATENT DOCUMENTS

| | | |
|---|---|---|
| 4,112,052 A | 9/1978 | Sartori et al. |
| 4,405,581 A | 9/1983 | Savage et al. |

(Continued)

FOREIGN PATENT DOCUMENTS

EP    0102712 B1    3/1989

OTHER PUBLICATIONS

P.C. Rooney, T.R. Bacon and M.S. duPart, "Effect of heat stable salts on MDEA solution corrosivity", Parts 1 and 2, Hydrocarbon Processing, Mar. 1996 and Apr. 1997.

(Continued)

*Primary Examiner* — Timothy Vanoy
(74) *Attorney, Agent, or Firm* — Glenn T. Barrett; Andrew T. Ward

(57) ABSTRACT

A method for the reduction of corrosion in a treatment unit acid used for separating hydrogen sulfide from and acid gas stream using an alkaline absorption solution. Ions comprising the $S^{2-}$ and/or $HS^-$ ions formed by the absorption of the hydrogen sulfide in the absorbent solution are subjected to in situ electrochemical oxidization to form polysulfide ions which form a protective coating on the surfaces of the unit.

15 Claims, 1 Drawing Sheet

(56) References Cited

U.S. PATENT DOCUMENTS

| | | | |
|---|---|---|---|
| 4,405,583 A | | 9/1983 | Stogryn et al. |
| 4,405,585 A | | 9/1983 | Sartori et al. |
| 4,471,138 A | | 9/1984 | Stogryn |
| 4,834,953 A | | 5/1989 | Audeh |
| 4,857,283 A | | 8/1989 | Madden, II |
| 4,894,178 A | | 1/1990 | Ho et al. |
| 4,944,917 A | * | 7/1990 | Madden et al. ............ 422/13 |
| 4,959,177 A | | 9/1990 | Schutt |
| 5,431,877 A | * | 7/1995 | Brucken et al. ............ 422/7 |
| 6,264,819 B1 | * | 7/2001 | Andoh et al. ............ 205/494 |
| 6,605,234 B1 | | 8/2003 | Roof et al. |
| 7,378,068 B2 | * | 5/2008 | Mao et al. ............ 423/220 |
| 8,668,887 B2 | * | 3/2014 | McGarvey et al. ............ 423/210 |
| 2010/0037775 A1 | | 2/2010 | Siskin et al. |

OTHER PUBLICATIONS

D.F. DeTar, Effects of Alkyl Groups on Rates of SN2 Reactions, Journal of Organic Chemistry, 45, 1980, pp. 5174-5176.

M. Behm and D. Simonsson, "Electrochemical production of polysulfides and sodium hydroxide from white liquor, Part 1: Experiments with rotating disc and ring-disc electrodes", Journal of Applied Electrochemistry, 27, 1997, pp. 507-518.

T.Y. Yan, "Reaction of Trace Mercury in Natural Gas with Dilute Polysulfide Solutions in a Packed Column", Ind. Eng. Chem. Res., 30, 1991, pp. 2592-2595.

\* cited by examiner

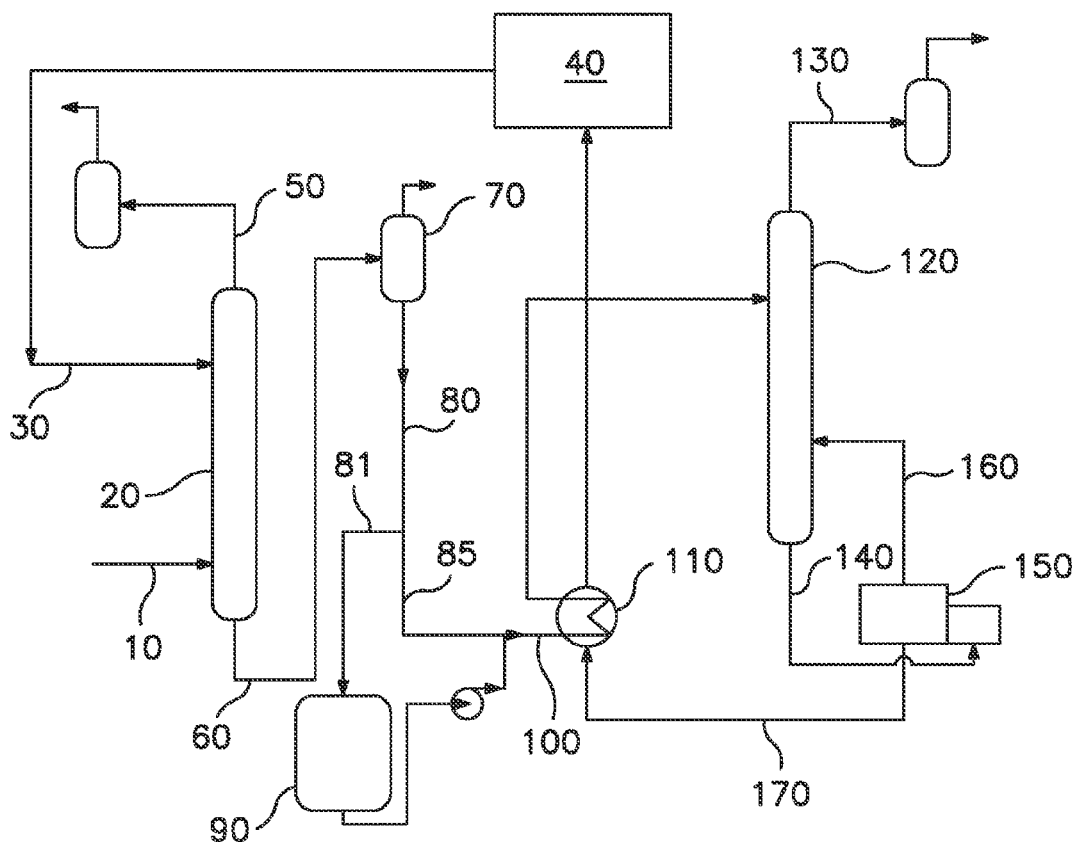

CORROSION CONTROL IN ACID GAS REMOVAL EQUIPMENT BY THE SITU GENERATION OF POLYSULFIDE IONS

CROSS REFERENCE TO RELATED APPLICATIONS

This application is a continuation-in-part of U.S. application Ser. No. 13/568,561, filed 7 Aug. 2012.

FIELD OF THE INVENTION

This invention relates to the in situ generation of polysulfide ions for inhibiting corrosion of metal surfaces in acid gas treatment systems.

BACKGROUND OF THE INVENTION

Acidic compounds, such as $CO_2$, $H_2S$ and COS in acid gas streams can be separated or removed from the streams by scrubbing with a liquid absorbent medium. The scrubbing process is extensively used in petroleum production operations and in petrochemical refining processes. A number of different technologies are available for removing acid gases such as carbon dioxide, hydrogen sulfide, carbonyl sulfide. These processes include, for example, chemical absorption (amine), physical absorption, cryogenic distillation (Ryan Holmes process), and membrane system separation. Of these, amine separation is a highly developed technology with a number of competing processes in hand using various amine sorbents such as monoethanolamine (MEA), diethanolamine (DEA), triethanolamine (TEA), methyldiethanolamine (MDEA), diisopropylamine (DIPA), diglycolamine (DGA), 2-amino-2-methyl-1-propanol (AMP) and piperazine (PZ). Of these, MEA, DEA, and MDEA are the ones most commonly used. The alkanolamine absorbents are usually preferred in view of the greater degree of solubility of the reaction products formed in the absorption process in water.

The amine purification process usually contacts the gas mixture countercurrently with an aqueous solution of the amine in an absorber tower. The liquid amine stream is then regenerated by desorption of the absorbed gases in a separate tower with the regenerated amine and the desorbed gases leaving the tower as separate streams. The various gas purification processes which are available are described, for example, in Gas Purification, Fifth Ed., Kohl and Neilsen, Gulf Publishing Company, 1997, ISBN-13: 978-0-88415-220-0.

An operational problem often encountered with acid gas abatement processes is corrosion of carbon steel and other low-alloy steels that are used in the construction of the piping and vessels of the treatment unit. The corrosion can be attributable to one or more of the following: decomposition of the scrubbing agent solvent, reaction of the acidic components of the gas and the scrubbing agent solvent; and direct attack by the acidic components in the gases. Another problem is the accumulation of heat stable salts (HSS) formed, for example, by the ingress of reactive contaminants and by degradation of amine, which in itself can lead to higher corrosion rate and equipment damage. HSS accumulation also consumes scrubbing agent solvents, reducing the amount available for acid gas absorption. Management of HSS levels can be achieved through a reclamation process or replacement of part of the amine inventory with fresh, uncontaminated amine ("bleed and feed" or larger bulk replacement) but corrosion inhibition technology has not been standard practice in amine treating systems due to the high cost of most programs and undesirable side effects (e.g., foaming). As such, for a typical acid gas treating facility, e.g., an amine treatment facility, the primary mitigation strategy for corrosion of carbon steel or other low-alloy steels has been to replace these materials with more corrosion-resistant stainless steel.

A more recent corrosion control program considered for acid-gas treating facilities involves the addition of soluble sodium tetrasulfide to the circulating amine. This program was shown in lab and field studies to form protective iron sulfide layers on carbon steel to reduce corrosion rates. Unfortunately, the high cost of the additive makes this concept economically infeasible. As an alternative, the introduction of soluble polysulfide ions was determined to be an effective corrosion mitigation strategy as they are effective to form protective sulfides on the walls of the equipment. U.S. Pat. Nos. 4,944,917, 4,857,283 and EP 102 712 describe the addition of ammonium or metal polysulfides or other means of forming polysulfide ions into the circulating amine treating solution. Although theoretically successful, the cost of these various chemical addition techniques has proved to be prohibitive in relation to their benefits and has resulted in limited commercial applicability to date. Alternatively, polysulfide ions can be obtained by the air oxidation of sulfide ions that are formed from dissociated hydrogen sulfide in the circulating amine solutions but air oxidation of sulfide ions degrades amine scrubbing agents, produces excessive quantities of additional oxidative HSS by-products that are detrimental to the process, and can react with diolefins to form a polymeric product that fouls equipment.

While the performance benefits of polysulfide ions have been determined, a more cost-effective method of generating the polysulfide ions is desired without the expense of, for example, ammonium or metal polysulfides additives, and without the disadvantages of obtaining polysulfide ions from air oxidized sulfide ions obtained from dissociated hydrogen sulfide. There also remains a need to integrate the polysulfide generation with effective management of corrosion of metal surfaces in acid gas removal processes used in petroleum production and refining operations as well as in chemical or petrochemical operations.

U.S. application Ser. No. 13/568,561, filed 7 Aug. 2012 discloses a method for operating an acid gas treatment unit with reduced corrosion in low alloy (carbon) steel treatment units utilizing the in situ generation of polysulfide ions by the use of an aqueous alkaline absorbent solution to absorb the $H_2S$ into the solution which is then contacted with elemental sulfur which reacts with the $HS^-$ and/or $S^{2-}$ ions to generate polysulfide ions.

SUMMARY OF THE INVENTION

We have now found that polysulfide ions can be generated in situ (e.g., in the form of an amine polysulfide) by the electrochemical oxidation of the hydrosulfide ($HS^-$) and/or sulfide and/or ($S^{2-}$) ions formed from dissociated hydrogen sulfide in the circulating amine treating solution a process stream. Effective amounts of circulating polysulfide ions can be achieved from the oxidation to obtain effective corrosion control, as well as to manage cyanide and mercury levels, while obviating the need for using purchasing polysulfides Accordingly, the present invention provides a method for in situ generation of polysulfide ions in an acid gas treatment process in which a circulating stream including $HS^-$ and/or $S^{2-}$ ions is subjected to electrochemical oxidation to generate polysulfide ions. Oxidation of the ions is achieved by flowing the rich amine solution from the absorption section of the unit through an electrochemical cell to generate the polysulfide ions which then react with the metal surfaces of the equipment to form a protective polysulfide coating.

Corrosion of metal surfaces of the acid-gas treatment unit, especially of mild (low alloy, carbon) steel is ameliorated using the polysulfide ions formed by the in situ electrochemical generation from the SH- and/or S2-ions. Examples of metal surfaces which can be protected in this way matter include the ferrous alloys e.g. mild (carbon) steel used in amine gas treating equipment. Without benefit of polysulfide ions, corrosion can otherwise occur, for example, throughout the entire gas treating system on metal surfaces in contact with the solutions and the acid gas. As the polysulfide ions generated by the oxidation are circulated through the equipment containing the amine scubbing agent, the polysulfide ions come into contact with the metal surface of the process equipment to form metal polysulfides in the form of a protective film or layer, which can reduce corrosion of the process equipment.

The $HS^-$ and/or $S^{2-}$ ions which are the precursors of the polysulfide ions are formed in the acid gas abatement process in the reaction of the absorbent solution with the gas stream containing $H_2S$; the gas stream can also include other reactive acidic components e.g., $CO_2$, $SO_2$, $SO_3$, $CS_2$, HCN, COS and a $C_1$-$C_4$ thiols. Typically, the gas stream containing the hydrosulfide and sulfide ions will be produced in the absorber tower where the scrubbing solution is brought into contact with the gas stream containing $H_2S$.

The scrubbing solution typically includes an alkanolamine, a metal hydroxide, a metal carbonate, a metal hydrated oxide, a metal bicarbonate, ammonium or amine cations, or a mixture of these. The amino compounds especially the alkanolamines are preferred; for example, the preferred scrubbing agents can be selected from monoethanolamine (MEA), diethanolamine (DEA), triethanolamine (TEA), dipropanolamine (DPA), diisopropanolamine (DIPA), methyldiethanolamine (MDEA), and diethylmonoethanolamine (DEAE and the severely sterically hindered amine compounds described below.

The acid gas separation is carried out by contacting the gas stream containing $H_2S$ with the selected absorbent solution to convert $H_2S$ to $HS^-$ and/or $S^{2-}$ ions, thereby generating a stream containing the absorbed $H_2S$ in the form of $HS^-$ and/or $S^{2-}$ ions. To generate the polysulfide ions, this stream is subjected to electrochemical oxidation; the resulting polysulfide ions then contact the metal surfaces of the equipment to form protective metal polysulfide coatings on the metal surface, thereby reducing corrosion. The polysulfide ions can also react with the mercury in the process stream to form mercury sulfide, which can be removed by filtration. Cyanide ($CN^-$) ions in the process stream can also be converted to more benign $SCN^-$ upon reaction with polysulfide ions.

DRAWINGS

The single FIGURE of the accompanying drawings is a simplified schematic of a cyclic separation unit incorporating an electrochemical oxidation section for generating polysulfide ions.

DETAILED DESCRIPTION

The acid gas sorbents used in the present gas separation process are normally used in the form of aqueous solutions which can be circulated in the normal type of continuous cyclic amine gas purification unit mentioned briefly above, comprising essentially an absorber tower in which the aqueous amine solution is contacted in countercurrent flow with the incoming gas mixture. The liquid amine stream is then passed to a regenerator in which the sorbed gases are desorbed by a change in conditions, typically a reduction of pressure or an increase in temperature although stripping with another gas stream may also be utilized; the regenerated sorbent solution and the desorbed gases leave the regenerator tower as separate streams. The present amine sorbents can be used in the same manner as conventional amine sorbents and consequently, similar operating practices in the units containing these sorbents can be followed.

The processed gas mixtures include $H_2S$, and may optionally include other acidic gases such as $CO_2$, $SO_2$, COS, HCN, as well as non-acidic gases such as $N_2$, $CH_4$, $H_2$, CO, $H_2O$, $C_2H_4$, $NH_3$, and the like. Gas mixtures of this type include natural gas, combustion gases, refinery gases, town gas, syn gas, water gas, propane, propylene and heavy hydrocarbon gases. The absorption process is also effective when the gaseous mixture is a gas obtained, for example, from shale oil retort, coal liquefaction or gasification, gasification of heavy oil with steam, air/steam or oxygen/steam, thermal conversion of heavy residual oil to lower molecular weight liquids and gases, e.g., fluid coker, Flexicoker™, or delayed coker or in sulfur plant tail gas cleanup operations. High selectivity for $H_2S$ absorption is favored for the present purposes although less selective absorption is not excluded when required by the feed gas or purification needs. If processing conditions are adjusted, non-selective removal of the acid gas components from the non-acidic components may be achieved with subsequent separation of the acidic gases one from another, e.g., separation of $H_2S$ from $CO_2$, allowing the $CO_2$ to be re-injected for reservoir pressure maintenance.

While various chemisorption agents may be used for the separation of the $H_2S$ from the acid gas streams, for example, ammonium hydroxides, ammonium salts, metal hydroxides, metal carbonates and bicarbonates, hydrated metal oxides, the preferred absorbents used in the separation units are the amino compounds, especially the alkanolamines such as monoethanolamine (MEA), diethanolamine (DEA), triethanolamine (TEA), dipropanolamine (DPA), diisopropanolamine (DIPA), methyldiethanolamine (MDEA), and diethylmonoethanolamine (DEAE). Special preference is given to the severely sterically hindered amino ethers, ether alcohols and alkoxy amino ethers, particularly to the amino ether derivatives of triethylene glycol. In operation, the absorbent solution will also contain other components including inorganic salts (e.g. heat stable salts).

The acid gas separation process may use amine-promoted alkaline salt scrubbing agents. For amine-promoted aqueous alkali metal salt scrubbing systems, the alkali metal salt can be selected from, for example, alkali metal bicarbonates, carbonates, hydroxides, borates, and phosphates. The cations in these systems can include the alkanolammonium cations, hydroxyammonium cations, and the like, along with various other alkali metal cations that may be present in solution. The concentration of the alkali metal compound can typically be about 5 to about 30 weight percent of the weight of the solution. The desired weight percent of the alkali metal compound is determined based upon the amine used. The weight percent is typically limited by the corrosion rate. For example it may be possible to operate a system at a higher concentration if the corrosion rate is controlled. With control of the corrosion rate, the currently employed amine weight percent ranges can be significantly increased. For MEA, the typical range is 15 to 25 weight percent, which is limited by corrosion. With the limitation of corrosion, the range can be extended from below 5 weight percent to in excess of 50 weight percent or more. Potassium carbonate is potentially usable in a concentration of from about 20 to about 35 weight percent and sodium hydroxide at a concentration of from about 5 to about 30 weight percent.

The preferred chemisorbents, namely, the sterically hindered amine ethers, are used in the form of aqueous solutions, typically from about 0.1 to 5M concentration in order to secure adequate loading; variations both within this range and outside it may be made according to individual processing requirements, e.g., concentration of gas species in total gas flow, size of unit, etc. In most cases, the rich solution will have an amine concentration of 0.05 to 2.5 M. Conditions in the separation unit will be typical of those used in conventional amine gas purification processes, for example, in temperature swing operation, sorption temperatures are typically in the range of 30-50° C., more usually 40-50° C. and desorption temperatures typically at 60 to 140° C., e.g., 100-125° C. In pressure swing operation the sorption and desorption pressures are usually set by the pressure of the incoming feed stream and perhaps also by any requirement for the product stream.

Sterically hindered amines react faster with $H_2S$ than with $CO_2$ via a proton transfer mechanism and a number of severely sterically hindered amino ether compounds have been developed for the selective removal of $H_2S$ in the presence of $CO_2$. The term "sterically hindered" refers to those amino compounds having a degree of steric hindrance such that the cumulative $-E_s$ value (Taft's steric hindrance constant) is greater than about 1.75 as calculated from the values given for primary amines in Table V in D. F. Detar, Journal of Organic Chemistry, 45, 5174 (1980), to which reference is made for such values.

The severely sterically hindered amines and alkanolamines disclosed in U.S. Pat. Nos. 4,405,581; 4,405,583; 4,405,585; 4,471,138 and 4,894,178 (mixture of BTEE and EEETB); U.S. 2010/0037775 discloses alkylamine alkyloxy alkyl ethers which are selective for the sorption of $H_2S$ from acidic gas mixtures containing $CO_2$. U.S. Pat. No. 4,112,052 describes the use of hindered amines for nearly complete removal of acid gases such as $CO_2$ and $H_2S$. Compared to aqueous MDEA and other conventional amine materials, the severely sterically hindered amines lead to much higher selectivity at high $H_2S$ loadings. Specific amino compounds described in these patents include BTEE (bis(tertiary-butylamino)-ethoxy-ethane synthesized from tertiary-butylamine and bis-(2-chloroethoxy)-ethane as well as EEETB (ethoxy-ethoxyethanol-tertiary-butylamine), synthesized from tertiary-butylamine and chloroethoxyethoxyethanol). Reference is made to these patent publications for a full description of these materials and their use in acidic gas sorption processes.

The absorbent solution should have a $pK_a$ value, at 20° C., greater than 8.6, preferably greater than about 9.5 in order to maintain a sufficient reserve of alkalinity to react with $H_2S$ and other acidic gases in the stream being treated. The $pK_a$ value of amino ether alcohols used as absorbents can typically and preferably range between about 9.5 and about 10.6. If the $pK_a$ is less than 8.6 the reaction with $H_2S$ may decreased to an unacceptable level (depending on the application), whereas if the $pK_a$ of the amine compound is much greater than about 10.6, an excessive amount of steam could be required to regenerate the scrubbing agent solvent. Also, to ensure operational efficiency with minimal losses of the amine compound, the amine compound absorbent should have a relatively low volatility. For example, the boiling point of the amine compound (at 760 mm) is preferably greater than about 180° C., or greater than 200° C., or even greater than 225° C.

The concentration of the amine scrubbing agent in the absorbent solution is typically from about 0.1 to about 6 moles per liter of the total solution, or from about 1 to about 4 moles per liter, depending primarily on the specific amine compound employed. The scrubbing agent solvent can include an amine component having an amine strength of at least 5% to about 60%, which denotes the effective amount of amine that would be available to react with an acid gas assuming some amine will react with the acid and therefore be in salt form.

The scrubbing agent solvent can further include a variety of additives typically employed in selective gas removal processes, e.g., antifoaming agents, anti-oxidants, and the like. The amount of these additives will typically be in the range that they are effective, i.e., an effective amount.

Cyclic Sorption Unit

The absorption step in which the hydrogen sulfide is separated involves contacting the normally gaseous stream with the absorbent solution in any suitable contacting vessel. In such processes, the normally gaseous mixture containing $H_2S$ is brought into intimate contact with the absorbent solution using conventional means, such as a tower or vessel packed with, for example, rings or with sieve plates, or a bubble reactor. Other acidic gaseous components may also be removed preferentially as compared to the $CO_2$, depending on the selected absorption agent. The present process is particularly suited to use in treatment units constructed of mild (non-stainless) steel which are otherwise susceptible to corrosion from the heat stable salts (HSS, also referred to as Heat Stable Amine Salts, HSAS) when total HSS concentrations exceed 0.5 wt. percent, based on the total inventory of the circulating amine solution.

In a typical mode of operation, the absorption step is conducted by feeding the normally gaseous mixture into the lower portion of the absorption tower while fresh absorbent solution is fed into the upper region of the tower. The gaseous mixture, freed largely from the $H_2S$, emerges from the upper portion of the tower, and the loaded absorbent solution, which contains the selectively absorbed $H_2S$, leaves the tower near or at its bottom. Preferably, the inlet temperature of the absorbent solution during the absorption step is in the range of from about 20° C. to about 100° C., and more preferably from 30° C. to about 60° C. Gas pressure at the inlet may vary widely according to the source of the gas stream; natural gas may be at a high wellhead pressure or may be reduced to meet equipment limitations, flue gas is usually at a low pressure; acceptable pressures are between 35 to 15,000 kPaa (about 5 to 2000 psia), usually 150 to 10,000 kPaa (about 20 to 1500 psia), and more commonly from 175 to 7,000 kPaa (about 25 to 1000 psia) in the absorber. The contacting takes place under conditions such that the $H_2S$ is absorbed by the solution. If $H_2S$ selective absorption in the presence of $CO_2$ and other acidic gases is required, the absorption conditions and apparatus are designed so as to minimize the residence time of the liquid in the absorber to reduce $CO_2$ pickup while at the same time maintaining sufficient residence time of gas mixture with liquid to absorb a maximum amount of the $H_2S$ gas. The amount of liquid required to be circulated to obtain a given degree of $H_2S$ removal will depend on the chemical structure and basicity of the scrubbing agent, e.g. amino compound, and on the partial pressure of $H_2S$ in the feed gas. Gas mixtures with low partial pressures such as those encountered in thermal conversion processes will require more liquid under the same absorption conditions than gases with higher partial pressures.

The rich solution leaving the absorber tower typically contains >0.05 mol/mol H$_2$S/absorbent solution, more preferably >0.1 mol/mol and most preferably >0.15 mol/mol. H$_2$S/absorbent A typical procedure for the selective H$_2$S removal phase of the process comprises selectively absorbing H$_2$S via countercurrent contact of the gaseous mixture containing H$_2$S and CO$_2$ with the solution of the amino compound in a column containing a plurality of trays at a low temperature, e.g., below 45° C., and at a gas velocity of at least about 0.1 m/sec. (about 0.3 ft/sec), based on "active" or aerated tray surface, depending on the operating pressure of gas, the tray column will typically have fewer than 20 contacting trays, with, e.g., 4-16 trays being normally employed.

After contacting the normally gaseous mixture with the absorbent solution, which becomes saturated or partially saturated with H$_2$S, the "rich" solution containing the chemisorbed H$_2$S in the form of hydrosulfide and sulfide ions is at least partially regenerated to be recycled back to the absorber. As with absorption, the regeneration may take place in a single liquid phase. Regeneration or desorption of the absorbent solution may be accomplished by conventional means such as pressure reduction of the solution or increase of temperature to a point at which the absorbed H$_2$S flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from about 50° C. to about 170° C., and preferably from about 80° C. to 120° C.; the pressure of the solution on regeneration will normally, as an approximate indication, range from 3 to 700 kPaa (about 0.5 to about 100 psia), more usually 6 to 350 kPaa (about 1 to about 50 psia). After at least a portion of the H$_2$S gas has been desorbed, the "lean" absorbent solution, is recycled back to the absorbing vessel. Makeup absorbent may be added as needed.

In the typical regeneration technique, the H$_2$S-rich solution is sent to the regenerator in which the absorbed components are stripped by steam which is generated by re-boil of the solution in the reboiler at the foot of the tower. Pressure in the flash drum and stripper is usually 6 to 350 kPaa (about 1 to about 50 psia), preferably 100 to 200 kPaa (about 15 to about 30 psia), and the temperature is typically in the range from about 50° C. to 170 C., preferably about 80° C. to 120° C. or optionally lower below the boiling point of the water at the selected pressure to reduce energy required for vaporization of the water. Stripper and flash temperatures will, of course, depend on stripper pressure, thus at 100 to 200 kPaa (about 15 to 30 psia) stripper pressures, the temperature will be about 80° C. to about 120° C. during desorption. Heating of the solution to be regenerated may very suitably be effected by means of indirect heating with low-pressure steam. It is also possible, however, to use direct injection of steam.

A typically cyclic absorption unit for separating hydrogen sulfide from a gas stream containing CO$_2$ and possibly other acidic components is shown in U.S. Patent Publication No. 2010/003775 to which reference is made for a description of such as unit. The unit described there does not contain a section for generating polysulfide ions but is referred to for an understanding of its general configuration typical of amine separation units. Prior U.S. application Ser. No. 13/568,561, filed 7 Aug. 2012, now U.S. Pat. No. 8,668,887, shows a cyclic absorption unit which contains a section for the in situ generation of polysulfide ions by reaction of the hydrosulfide and sulfide ions with elemental sulfur and the general configuration of the unit is applicable to the present electrochemical technique with the replacement of the section in which contact with the elemental sulfur is carried out by an electrochemical oxidation section, as described below.

FIG. 1 depicts a schematic representation of an exemplary acid gas treating unit with an electrochemical oxidation section. An untreated gas stream containing acid gas components including hydrogen sulfide is fed through line 10 to absorber tower 20, which also receives a feed of a solution of a lean amine scrubbing solution through line 30 from a lean amine storage tank or drum 40. Treated gas leaves the overhead 50 of the absorber tower to be further processed and eventually released to the atmosphere or directed to other areas within the refinery. The formerly lean amine scrubbing agent, having been loaded with hydrosulfide and/or disulfide ions upon reaction with H$_2$S in the absorber tower e.g., in the form of amine hydrosulfide, is now considered a rich amine process stream in line 60.

The rich amine process stream is introduced to a flash drum 70, and then directed from the bottom of the flash drum by way of line 80 with a line 81 leading to a polysulfide generation section 90. The polysulfide generation vessel can take the form of a vessel in which the electrochemical oxidation of the hydrosulfide and sulfide ions takes place as described below as the by-passed portion of stream 80 passes through it. The flowing rich amine stream undergoes anaerobic oxidation with the subsequent formation of polysulfide ions that subsequently circulate through the system and participate in the reaction forming the sulfide protective film. Alternatively, the polysulfide generation vessel can be bypassed via bypass line 85.

After passing through the polysulfide generation section, the rich solution stream 100 is introduced to a hot lean heat exchanger 110 where it is heated and introduced to regeneration tower 120. The overhead 130 from the regeneration tower contains isolated acid gas components, which are eventually directed to, for example, a sulfur plant e.g. Claus unit with tail gas clean-up. The stream from the bottom of the regeneration tower, which still contains the in situ generated polysulfide ions, is directed through line 140 to reboiler 150. A portion of the heated process stream 160 is directed back to the regeneration tower as reboil and a portion is directed through line 170 to the lean heat exchanger to be cooled by the stream in line 100 from the polysulfide generation section for eventual storage in lean amine storage tank 40.

The cyclic separation process may be operated at or near standard operating conditions as described above or at non standard operating conditions that are outside of normal operating ranges. For example, by running amines at a substantial higher concentrations, the system could be operating at significantly lower temperatures e.g., below freezing temperatures. Once generated, polysulfide solutions are stable, with high-temperature degradation being the only known degradation process. Aqueous polysulfides are generally stable at temperatures up to about 125-130° C. (about 260-265° F.), but if the temperature exceeds about 135° C. (275° F.), degradation will occur, which will lower the concentration of active polysulfide.

Electrochemical Oxidation of HS$^-$ Ions to Form Polysulfide

In basic solution, the hydrosulfide ion (HS-) can be oxidized in aqueous solution to generate polysulfide ions by anodic and cathodic reactions as described below:

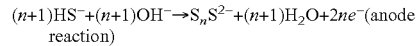
$(n+1)HS^- + (n+1)OH^- \rightarrow S_nS^{2-} + (n+1)H_2O + 2ne^-$ (anode reaction)

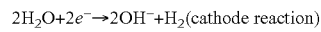
$2H_2O + 2e^- \rightarrow 2OH^- + H_2$ (cathode reaction)

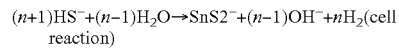
$(n+1)HS^- + (n-1)H_2O \rightarrow SnS2^- + (n-1)OH^- + nH_2$ (cell reaction)

These electrochemical equations differ from the chemical reactions that result in polysulfide formation from elemental sulfur and the hydrosulfide ion. The reaction chemistry is complex, and many species can be present, but the important reactions generate polysulfide species with chain lengths between 4 and 7.

$$2HS^- + S8 \rightarrow HS9^- \rightarrow S_9^{2-} + H^+$$

$$S_9^{2-} + HS^- \rightarrow 2S_5^{2-} + H^-$$

$$2S_5^{2-} \rightarrow S_6^{2-} + S_4^{2-}$$

$$nS + SH^- + (1-p)OH^- \rightarrow H_p S_n S^{p-2} + (1-p)H_2O$$

$$m + nS2^- + S \rightarrow S_m + nS^{2-}$$

$$Sm + nS^{2-} + HS^- + OH^- \rightarrow S_m S^{2-} + S_n S^{2-} + H_2O$$

where $S_m S^{2-} + S_n S^{2-}$ are polysulfide ions with different sulfur chain lengths.

Electrochemical generation of polysulfide has been accomplished in caustic solutions associated with the pulp and paper industry, but not in the basic solvents that are employed in the oil and gas industry for handling and treating acid gases.

The electrochemical generation of polysulfide ions in the present process may be carried out by the anodic oxidation of the hydrosulfide ions under conditions the same or comparable to those described by Behm and Simonsson in *Journal of Applied Electrochemistry* 27, 507-518 (1997): Electrochemical production of polysulfides and sodium hydroxide from white liquor Part 1: Experiments with rotating disc and ring-disc electrodes. In the present process, the oxidation of the rich solution entering the polysulfide generation section can be carried out using a membrane cell in which the polysulfides are produced in the anode compartment at comparable anode potentials and current densities. The alkaline conditions appropriate for the electrode reactions are generally within the normal operating ranges of the amine (or other) acid gas treatment processes so that the electrochemical generation of the polysulfide ions is achievable without significant conceptual barriers to success. As the sulfur concentration in the present rich sorption solutions is generally lower than in white liquor, the deposition of sulfur at the anode is less likely to be problematical but similar expedients such as rotating disc electrodes with scrapers may by utilized if necessary to maintain proper anode operation. Suitable temperatures in the cell are comparable to those in the amine absorption process from 20 to 90° C. but if necessary, the solution passing into the cell may be heated or cooled as necessary for efficient cell operation.

The presently electrochemical oxidation technique therefore provides for facile and commercially feasible in situ generation of polysulfide ions in process streams that contain circulating amine solutions used for the treatment of acidic gases that contain hydrogen sulfide. The dissociated hydrogen sulfide in the circulating amine treating solutions, i.e., the rich amine solutions are oxidized anaerobically without the use of oxygen or other chemical oxidizing agents, avoiding the significant detrimental effect of degrading amine and forming excessive quantities of additional oxidative HSS byproducts, diolefin polymers, aldehyde and other oxygenate polymers that are detrimental to the process. The present electrochemical oxidation technique enables the oxidation to be carried out in a manner that is not detrimental to the overall process and results in a net beneficial effect without high additive costs to sustain the process.

Corrosion Control

The reaction between iron and polysulfide ions to form the protective polysulfide coating on the walls of the ferrous equipment is shown as:

$$S_x^{2-} + Fe \rightarrow FeS_x$$

Other protective sulfide compounds could also be formed from the polysulfide ions, including metal sulfide such as chromium sulfide, manganese sulfide, nickel sulfide and other metals based on components of alloys used in the pipes, reactor vessels and other process stream fittings. The protective metal sulfide film may encompass both metal sulfide metal polysulfide films. As such, X can be greater than, less than or equal to 1, typically between 0.1 and 2. X is dependent on temperature, sulfide content, elemental sulfur content, and the ratio of sulfide content to elemental sulfur content (polysulfide chain length).

Cyanide Control

Polysulfide ions can also manage the impact of cyanide ions in scrubbing agent solvent, to control the negative effects of cyanide in acid gas treatment processes. For example, the introduction of elemental sulfur to generate polysulfide ions can prevent hydrogen embrittlement in the upper parts of a regeneration tower. The HCN amine salt partially decomposes in the upper section of the regenerator to give HCN which produces $H^+$ ions. $H^+$ penetrates the metal structure and gets converted to a larger $H_2$ molecule, causing tremendous force inside the metal that causes it to split. The polysulfide ions, however, can be used to convert cyanide ions to form the more benign thiocyanate ions and a polysulfide ion with one less sulfur atom:

$$CN^- + S_n^{2-} \rightarrow SCN^- + S_{n-1}^{2-} \tag{11}$$

This reaction can proceed at high rate depending on the concentration of the polysulfide ions in the circulating scrubbing solution. Due to reaction with polysulfide ion, the cyanide concentration of the process stream can be maintained below 50 ppm. The thiocyanate ions can be left in the process stream. The thiocyanate ions are part of the heat stable salts (HSS).

Mercury Control

The polysulfide ions may also be capable of providing mercury control when this metal which is found in at least trace quantities in all crudes and condensates, is present. The polysulfides provide the ability to use existing gas treatment equipment to precipitate soluble/reactive mercury as an insoluble mercury sulfide that can be subsequently removed by filtration. Polysulfide ions can react with elemental mercury to form insoluble mercury sulfide via, for example, the following reaction:

$$Hg + S_n^{2-} \rightarrow HgS + S_{n-1}^{2-}$$

In this way, mercury can be precipitated from a process stream by the introduction of the polysulfide ions and the resulting insoluble precipitate removed from the process stream by standard filtration techniques. Deleterious elemental mercury can be reduced to relatively benign mercury sulfide at a much higher rate of reaction due to higher concentration of polysulfide in the circulating scrubbing solution. Further details can be found in Yan, *Ind. Eng. Chem. Res.,* 30: 2592-2595 (1991), to which reference is made. This can prevent mercury contamination from being a problem in downstream hydrocarbon service.

The generation of the polysulfide ions may also provide for arsine control by enabling existing equipment to be used to precipitate arsine as an insoluble arsenic trisulfide that can be subsequently removed by filtration. Polysulfide can react with arsine to form insoluble arsenic trisulfide by, for example, the following reaction:

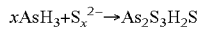

Arsine can therefore be converted to the insoluble arsenic trisulfide which can then be removed from the process stream by standard filtration techniques.

In addition to the benefits of reduced corrosion of vulnerable process equipment (e.g., mild carbon, low-alloy steel), as well as mercury, cyanide and arsine control, as discussed above, additional related benefits for the methods and systems described herein for the in situ generation of polysulfide ions include the ability to: operate with higher amine strength, lower circulation rates and steam requirements; operate with elevated heat stable salt concentrations; and operate with higher acid gas loading. For example, the presently disclosed techniques can allow operation with heat stable salts exceeding 3 wt %, operating with MEA at concentrations exceeding 25%, or DEA at concentrations exceeding 35%, and rich amine loadings for rich amine loadings for MEA or DEA exceeding 0.5-0.7 moles acid gas/mole amine in presence of significant $CO_2$ or 0.7 mol/mol loading with low $CO_2$.

Conventional acid gas treatment units in refineries can be used in the process of this invention without significant modification. The physical properties, especially the density of amine polysulfide solutions vs. amine sulfide solutions (rich amine) can be also used to further reduce the capital cost of installation, and simplify operation of additive generation and injection equipment. For example, the density of the amine polysulfide solutions can be used to create a simple generation and injection facility, since amine polysulfide will be generated at the bottom of the vessel, and can then be directed from the vessel and to the process stream.

The invention claimed is:

1. A method for operating an acid gas treatment unit with reduced corrosion by the in situ generation of polysulfide ions comprising:
    (a) contacting an acid gas stream containing $H_2S$ with an aqueous alkaline absorbent solution to absorb the $H_2S$ into the solution to form a process stream including HS and/or $S_2$-ions; and
    (b) subjecting the stream containing the HS- and/or $S_2$-ions to electrochemical oxidation to oxidize the HS- and/or S2-ions to generate polysulfide ions, and
    (c) regenerating the aqueous alkaline absorbent solution to release acid gas components from the solution;
wherein the aqueous alkaline absorbent solution is contained in an acid gas treatment unit having a metal surface which the polysulfide ions contact to form metal-polysulfide on the metal surface to ameliorate corrosion of the metal surface.

2. The method of claim 1 in which the acid gas stream fluid stream also comprises at least one of $CO_2$, $SO_2$, $SO_3$, $CS_2$, HCN, COS or a C1-C4 thiol.

3. The method of claim 1 in which the aqueous alkaline absorbent solution includes an alkanolamine, a metal hydroxide, a metal carbonate, a metal hydrated oxide, a metal bicarbonate, ammonium or amine cations.

4. The method of claim 1 in which the aqueous alkaline absorbent solution includes a sterically hindered aminoether compound having a degree of steric hindrance such that the cumulative –Es value (Taft's steric hindrance constant) is greater than 1.75.

5. The method of claim 1 in which the aqueous alkaline absorbent solution includes an alkanolamines selected from monoethanolamine (MEA), diethanolamine (DEA), triethanolamine (TEA), dipropanolamine (DPA), diisopropanolamine (DIPA), methyldiethanolamine (MDEA), or diethylmonoethanolamine (DEAE).

6. The method of claim 1 in which the acid gas stream includes mercury which is reacted with the polysulfide ions in the aqueous alkaline absorbent solution stream to form mercury sulfide which is filtered from the aqueous alkaline absorbent solution stream.

7. The method of claim 1 in which the acid gas process stream includes cyanide ions which are reacted with the polysulfide ions in the aqueous alkaline absorbent solution stream to form thiocyanate ions, to create benign thiocyanate.

8. The method of claim 1 in which the acid gas process stream includes arsine which is reacted with the polysulfide ions in the aqueous alkaline absorbent solution stream to react to form arsenic trisulfide which is filtered from the aqueous alkaline absorbent solution stream.

9. The method of claim 1 in which the stream containing the HS- and/or $S_2$-ions is subjected to electrochemical oxidation in the anode compartment of an electrochemical cell.

10. The method of claim 1 in which the acid gas stream containing $H_2S$ is contacted with the aqueous alkaline absorbent solution in a carbon steel gas treatment unit.

11. The method of claim 1 in which the aqueous alkaline absorbent solution contains a total concentration of heat stable salts in excess of 0.5 wt. percent of the solution.

12. The method of claim 11 in which the aqueous alkaline absorbent solution contains a total concentration of heat stable salts in excess of 3 wt. percent of the solution.

13. The method of claim 1 in which the aqueous alkaline absorbent solution includes monoethanolamine (MEA) at a concentration exceeding 25 wt. percent of the solution.

14. The method of claim 1 in which the aqueous alkaline absorbent solution includes diethanolamine (DEA) at a concentration exceeding 25 wt. percent of the solution.

15. The method of claim 1 in which the aqueous alkaline absorbent solution includes and alkanolamines selected from monoethanolamine (MEA) or diethanolamine (DEA) and the process stream including HS- and/or $S_2$-ions contains 0.5-0.7 moles acid gas/mole alkanolamine.

* * * * *